United States Patent
Kodo et al.

(10) Patent No.: US 8,723,908 B2
(45) Date of Patent: May 13, 2014

(54) OPTICAL SCANNING DEVICE INCLUDING PLURAL LENSES AND IMAGE FORMING APPARATUS

(75) Inventors: Masahiro Kodo, Shizuoka-ken (JP); Yoshihisa Masuda, Kanagawa-ken (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 7 days.

(21) Appl. No.: 13/347,534

(22) Filed: Jan. 10, 2012

(65) Prior Publication Data

US 2012/0182372 A1    Jul. 19, 2012

Related U.S. Application Data

(60) Provisional application No. 61/432,471, filed on Jan. 13, 2011.

(51) Int. Cl.
*B41J 2/385* (2006.01)
*B41J 15/14* (2006.01)
*B41J 27/00* (2006.01)

(52) U.S. Cl.
USPC ........... 347/259; 347/134; 347/241; 347/243; 347/256; 347/258; 347/260; 347/261

(58) Field of Classification Search
USPC ......... 347/134, 241, 243, 256, 258, 259, 260, 347/261
See application file for complete search history.

(56) References Cited

U.S. PATENT DOCUMENTS

| 5,784,094 A * | 7/1998 | Ota et al. ...................... 347/243 |
| 2006/0139715 A1 | 6/2006 | Tamaru et al. |
| 2009/0096856 A1* | 4/2009 | Kimura .......................... 347/243 |
| 2009/0323147 A1* | 12/2009 | Amada et al. .............. 359/205.1 |

* cited by examiner

*Primary Examiner* — Alessandro Amari
*Assistant Examiner* — Kendrick Liu
(74) *Attorney, Agent, or Firm* — Patterson & Sheridan, L.L.P.

(57) ABSTRACT

According to one embodiment, an optical scanning device includes plural light sources, a polygon mirror, a first lens, a first reflection mirror, and a second lens. The polygon mirror deflects lights emitted from the plural light sources in a pre-determined direction. The first lens allows the lights emitted from the plural light sources and deflected by the polygon mirror to pass. The first reflection mirror reflects the lights passed through the first lens in a direction different from the deflecting direction of the polygon mirror. The second lens receives incidence of the lights reflected by the first reflection mirror from a direction different from an incident direction of the first lens and allows, with one lens, the lights emitted from the plural light sources to pass.

10 Claims, 4 Drawing Sheets

OPTICAL SCANNING DEVICE INCLUDING PLURAL LENSES AND IMAGE FORMING APPARATUS

CROSS-REFERENCE TO RELATED APPLICATION

This application is based upon and claims the benefit of priority from the prior U.S. patent application No. 61/432,471, filed on Jan. 13, 2011, the entire contents of which are incorporated herein by reference.

FIELD

Embodiments described herein relate generally to an optical scanning device and an image forming apparatus.

BACKGROUND

In the past, a color image forming apparatus includes an optical scanning device including a lens that allows, with one lens, plural beams corresponding to colors to pass. The optical scanning device includes a set of a first fθ lens and a second fθ lens that use the plural beams in common. In the optical scanning device, light passed through the first fθ lens is made incident on the second fθ lens. After passing through the second fθ lens, the light is decomposed for each of the colors using a reflection mirror and led to a photoconductive member. Therefore, in the optical scanning device, a light source, a polygon mirror, and the first fθ lens are arranged on one side of the second fθ lens. The reflection mirror for separating the colors is arranged on the other side of the second fθ lens. The polygon mirror, the first fθ lens, the second fθ lens, and the reflection mirror for separating the colors provided in the optical scanning device are arranged in one direction. In other words, the polygon mirror, the first fθ lens, the second fθ lens, and the reflection mirror for separating the colors are arranged in an optical axis direction of light reflected by the polygon mirror.

Therefore, the optical scanning device is elongated in the optical axis direction of the light reflected by the polygon mirror. As a result, the size of the color image forming apparatus is increased.

DETAILED DESCRIPTION

In general, according to one embodiment, there is provided an optical scanning device including plural light sources, a polygon mirror, a first lens, a first reflection mirror, and a second lens. The polygon mirror deflects lights emitted from the plural light sources in a predetermined direction. The first lens allows the lights emitted from the plural light sources and deflected by the polygon mirror to pass. The first reflection mirror reflects the lights passed through the first lens in a direction different from the deflecting direction of the polygon mirror. The second lens receives incidence of the lights reflected by the first reflection mirror from a direction different from an incident direction of the first lens and allows, with one lens, the lights emitted from the plural light sources to pass.

Figure 1:
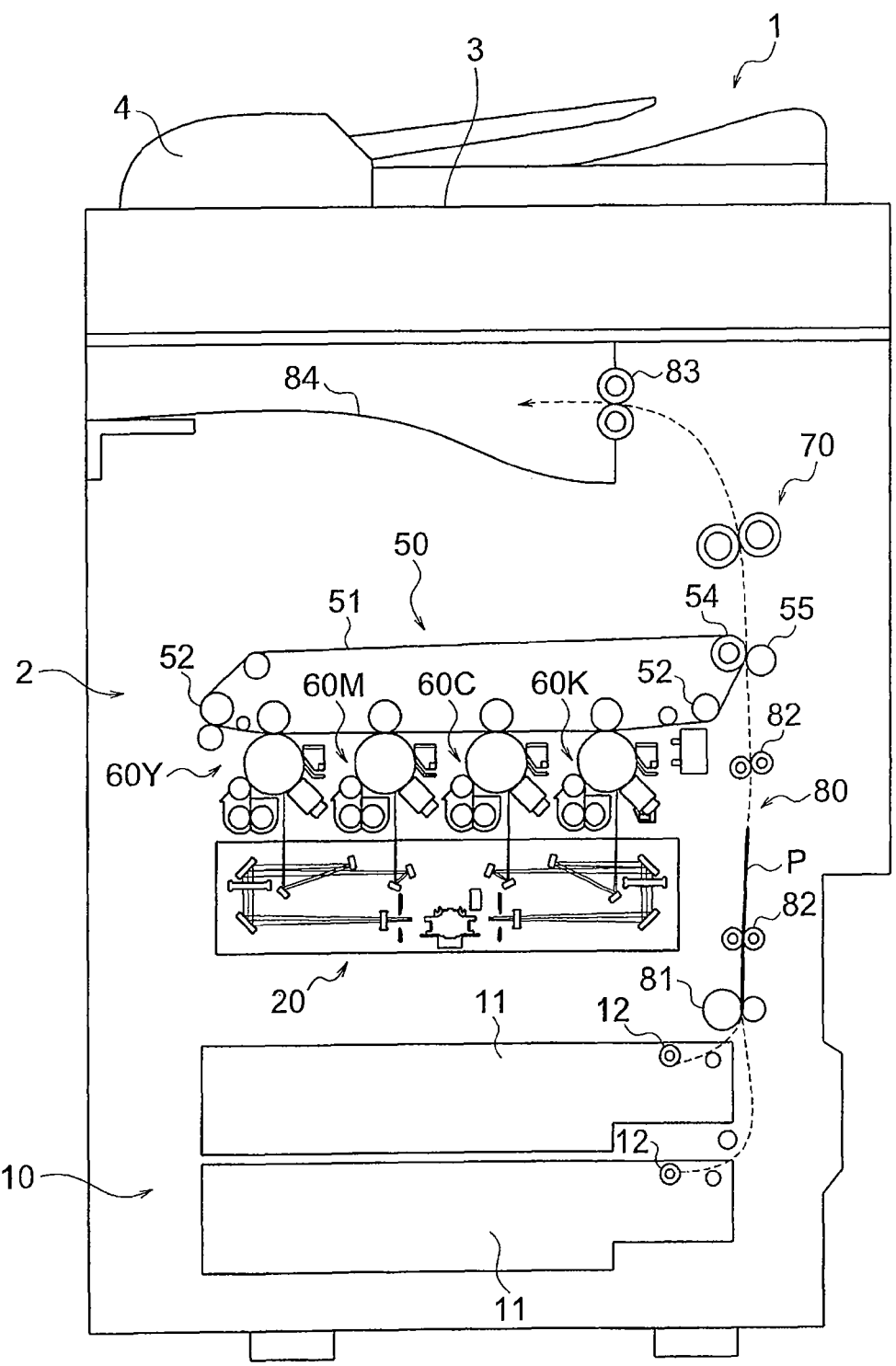
FIG. 1 is a longitudinal sectional view of an image forming apparatus according to an embodiment.

FIG. 1 is a longitudinal sectional view of a color multi function peripheral (MFP) 1, which is an image forming apparatus. The multi function peripheral 1 includes a print section 2, a scanner section 3, and a document feeding section 4.

The print section 2 includes a paper feeding section 10, a laser optical unit 20, which is an optical scanning device, an image forming section 50, a fuser 70, which is a fuser section, and a conveying section 80.

The paper feeding section 10 includes plural paper feeding cassettes 11 that store sheets P stacked like layers and pickup rollers 12 that feed the sheets P, which are recording media, in the top layers of the sheets P stored in the cassettes 11 to the image forming section 50.

The image forming section 50 includes four image forming stations 60Y, 60M, 60C, and 60K for Y (yellow), M (magenta), C (cyan), and K (black), an intermediate transfer belt 51 that transfers toner images formed by the image forming stations 60Y, 60M, 60C, and 60K, plural rollers 52 for applying predetermined tension to the intermediate transfer belt 51, and a driving roller 54 for driving the intermediate transfer belt 51. The image forming section 50 includes a transfer roller 55, which is a transfer device. Apart of the intermediate transfer belt 51 is arranged between the driving roller 54 and the transfer roller 55.

The conveying section 80 includes a registration roller 81 that starts conveyance of the sheet P let out from the pickup rollers 12 to the image forming section 50 at predetermined timing and plural conveying rollers 82 that convey the sheet P let out from the registration roller 81. The conveying section 80 includes a paper discharge roller 83 just before a position where the sheet P is discharged to the outside of the print section 2. A paper discharge tray 84 that receives the sheet P discharged by the paper discharge roller 83 is formed on the upper surface of the print section 2.

Figure 2:
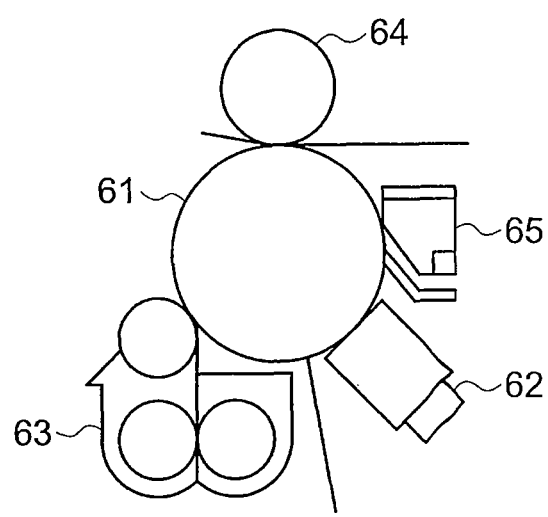
FIG. 2 is an enlarged view of the periphery of a photoconductive member shown in FIG. 1.

An enlarged view of one image forming station 60 is shown in FIG. 2.

The image forming station 60 includes a photoconductive member 61 on which light emitted from the laser optical unit 20 is irradiated, a charging device 62 that applies uniform charges to the photoconductive member 61, a developing device 63 that stores a toner on the inside and supplies the toner to the photoconductive member 61, an intermediate transfer roller 64 that transfers the toner supplied to the photoconductive member 61 onto the intermediate transfer belt 51, and a cleaning unit 65 that cleans the toner remaining on the photoconductive member 61 without being transferred onto the intermediate transfer belt 51. All the image forming stations 60Y, 60M, 60C, and 60K have the same configuration.

Action of image formation is explained.

The charging device 62 applies uniform charges to the photoconductive member 61. On the photoconductive member 61 applied with the uniform charges, a latent image is formed by the light emitted from the laser optical unit 20. The developing device 63 supplies the toner to the photoconductive member 61 and forms a toner image on the photoconductive member 61. The toner image formed on the photoconductive member 61 by the developing device 63 is transferred onto the intermediate transfer belt 51 by the intermediate transfer roller 64.

The sheet P let out from the paper feeding cassettes 11 by the pickup rollers 12 is conveyed by the plural conveying rollers 82. When the sheet P reaches the transfer roller 55, the toner image formed on the intermediate transfer belt 51 is transferred onto the sheet P. The sheet P having the image transferred thereon is further conveyed. The image is fixed on the sheet P by the fuser 70. The sheet P having the image fixed thereon is discharged to the paper discharge tray 84.

Figure 3:
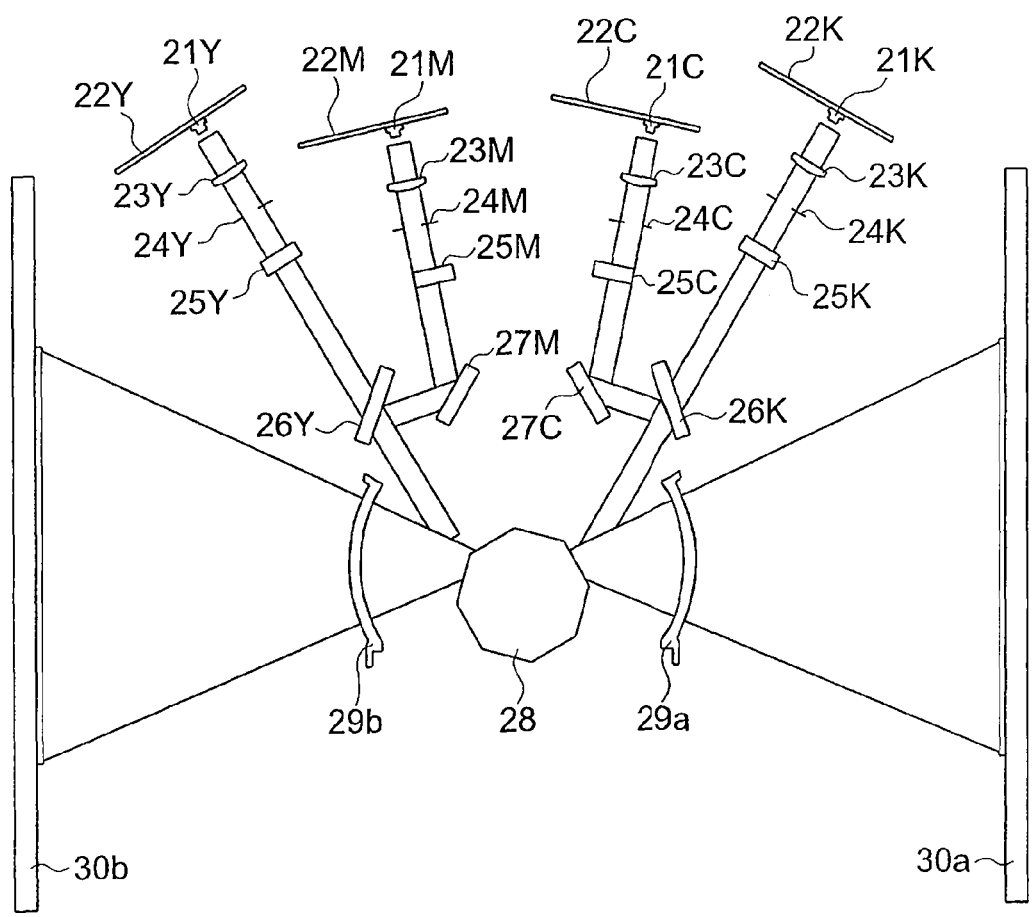
FIG. 3 is a plan view of an optical scanning device.
Figure 4:
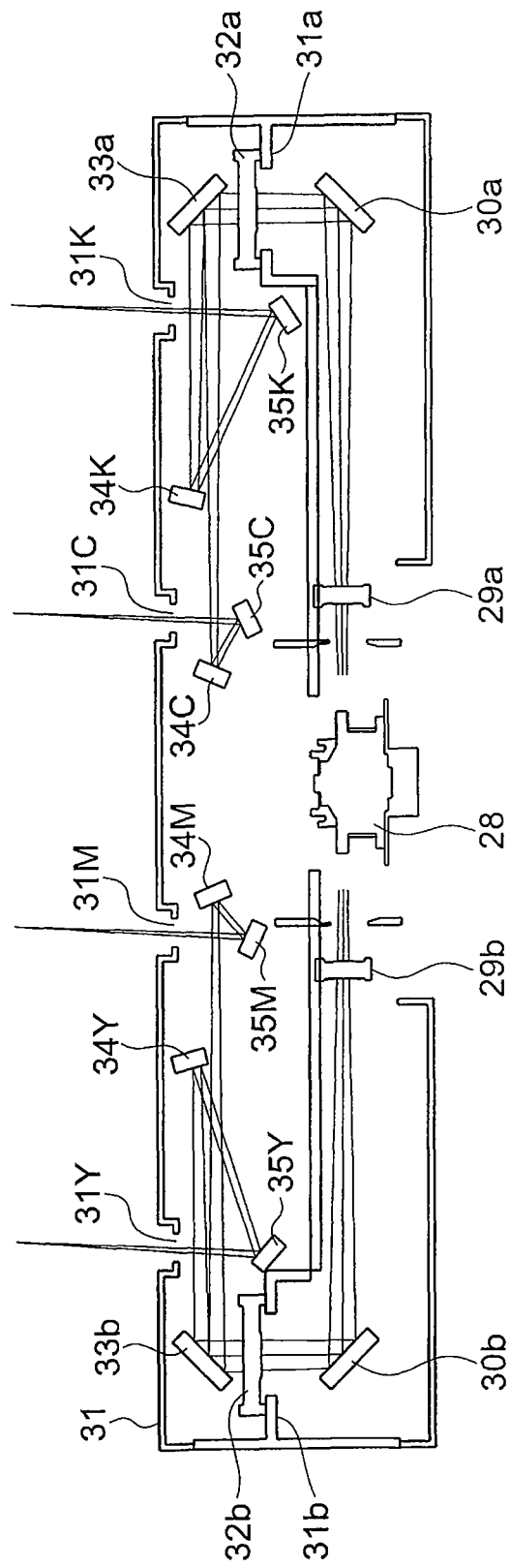
FIG. 4 is a longitudinal sectional view of the optical scanning device.

The laser optical unit 20 is explained in detail with reference to FIGS. 3 and 4. FIG. 3 is a plan view of the laser optical unit 20. FIG. 4 is a longitudinal sectional view of the optical scanning device.

In the laser optical unit 20, plural laser diodes 21, which are light sources, are provided to correspond to the number of toners of colors. The laser optical unit 20 further includes plural laser diode driving circuits for images 22, plural collimate lenses 23, plural apertures 24, plural cylinder lenses 25, plural half-mirrors 26, and plural light-source-side reflection mirrors 27. Reference signs are distinguished from one another with first letters of the colors affixed thereto to correspond to the respective colors in such a manner as a laser diode for yellow image 21Y, a laser diode for magenta image 21M, a laser diode for cyan image 21C, and a laser diode for black image 21K. Components for black are explained as representatives. Concerning components for the other colors, explanation of common parts is omitted. The laser diode for black image 21K is attached to a laser diode driving circuit for black image 22K that drives the laser diode for black image 21K. A collimate lens 23K, an aperture 24K, a cylinder lens 25K, and a half-mirror 26K are arranged in a row and in order in an emission direction of the laser diode for black image 21K. A collimate lens 23C, an aperture 24C, a cylinder lens 25C, and a light-source-side reflection mirror 27C are arranged in a row and in order in an emission direction of the laser diode for cyan image 21C. The light-source-side reflection mirror 27C is arranged in a position where the light-source-side reflection mirror 27C reflects light passed through the cylinder lens 25C and makes the light incident on the half-mirror 26K. Components for yellow image are the same as the components for black image. Components for magenta image are the same as the components for cyan image. Therefore, explanation of the components for yellow image and the components for magenta image is omitted.

The laser optical unit 20 includes one polygon mirror 28, two first fθ lenses 29, which are first lenses, and two first reflection mirrors 30. The polygon mirror 28 is arranged ahead in the emission direction of the laser diode for black image 21K and ahead in the emission direction of the laser diode for yellow image 21Y. First fθ lenses 29a and 29b are arranged on both sides of the polygon mirror 28. In other words, the polygon mirror 28 is arranged between the first fθ lenses 29a and 29b.

Further, the laser optical unit 20 includes a housing 31, two first reflection mirrors 30a and 30b, two second fθ lenses 32a and 32b, two second reflection mirrors 33a and 33b, four third reflection mirrors 34Y, 34M, 34C, and 34K, four fourth reflection mirrors 35Y, 35M, 35C, and 35K. Holes 31Y, 31M, 31C, and 31K through which lights to be irradiated on the photoconductive members 61 corresponding to the colors are emitted are provided on the upper surface of the housing 31.

The first fθ lens 29a and the first reflection mirror 30a are arranged on a straight line in the horizontal direction. The first reflection mirror 30a, the second fθ lens 32a, and the second reflection mirror 33a are arranged on a straight line in the vertical direction. In other words, a traveling direction of light passed through the first fθ lens 29a is changed at a right angle by the first reflection mirror 30a. The traveling direction does not need to be accurately changed at a right angle and may be changed in a certain range.

The housing 31 includes supporting sections 31a and 31b extending from substantially the centers in the vertical direction of sidewalls. The length of the supporting sections 31a and 31b is smaller than the length of the second fθ lenses 32a and 32b in a direction orthogonal to an optical axis direction, which is a direction in which lights pass through the second fθ lenses 32a and 32b. One end of the second fθ lens 32a is provided on the supporting section 31a. The other end of the second fθ lens 32b is provided on the supporting section 31b. Since the length of the supporting section 31a is smaller than the length of the second fθ lens 32a in the direction orthogonal to the optical axis direction of the second fθ lens 32a. Therefore, the second fθ lens 32a is arranged near the sidewall of the housing 31. The same applies to the second fθ lens 32b.

The lengths in the optical axis direction of the first fθ lenses 29a and 29b and the second fθ lenses 32a and 32b are smaller than the lengths thereof in the direction orthogonal to the optical axis direction. In other words, the thicknesses of the first fθ lenses 29a and 29b and the second fθ lenses 32a and 32b are smaller than the lengths thereof in a direction orthogonal to the thicknesses.

In FIG. 3, the polygon mirror 28 is arranged in the center. In FIG. 3, the first fθ lens 29a, the first reflection mirror 30a, the second fθ lens 32a, the second reflection mirror 33a, the third reflection mirrors 34K and 34C, the fourth reflection mirrors 35K and 35C, and the supporting section 31a are arranged on one side of the polygon mirror 28. The first fθ lens 29b, the first reflection mirror 30b, the second fθ lens 32b, the second reflection mirror 33b, the third reflection mirrors 34Y and 34M, the fourth reflection mirrors 35Y and 35M, and the supporting section 31b are arranged on the other side of the polygon mirror 28. In other words, the first fθ lenses, the first reflection mirrors, the second fθ lenses, the second reflection mirrors, and the supporting sections are arranged in line-symmetrical positions around the polygon mirror 28. The third reflection mirrors and the fourth reflection mirrors may also be line-symmetrically arranged around the polygon mirror 28.

One first fθ lens 29a allows lights corresponding to two colors, black and cyan, to pass. One first fθ lens 29b allows lights corresponding to two colors, yellow and magenta, to pass. One second fθ lens 32a allows lights corresponding to two colors, black and cyan, to pass. One second fθ lens 32b allows lights corresponding to two colors, yellow and magenta, to pass. In other words, the first fθ lenses and the second fθ lenses allow the lights corresponding to the plural colors to pass.

The third reflection mirrors 34K and 34C are arranged further on the polygon mirror 28 side than the second reflection mirror 33a. The third reflection mirrors 34Y and 34M are arranged further on the polygon mirror 28 side than the second reflection mirror 33b.

The fourth reflection mirror 35K is provided between the second reflection mirror 33a and the third reflection mirror 34K in the horizontal direction and located below the hole 31K provided in the housing 31. The fourth reflection mirror 35C is provided between the second reflection mirror 33a and the third reflection mirror 34C in the horizontal direction and located below the hole 31C provided in the housing 31. The fourth reflection mirror 35Y is provided between the second reflection mirror 33b and the third reflection mirror 34Y in the horizontal direction and located under the hole 31Y provided in the housing 31. The fourth reflection mirror 35M is provided between the second reflection mirror 33b and the third reflection mirror 34M in the horizontal direction and located below the hole 31M provided in the housing 31.

Action of a laser optical system is explained.

Light emitted from the laser diode for black image 21K passes through the collimate lens for black image 23K, the aperture for black image 24K, the cylinder lens for black image 25K, and the half-mirror for black image 26K in order and is deflected by the polygon mirror 28. Light emitted from the laser diode for cyan image 21C passes through the collimate lens for cyan image 23C, the aperture for cyan image 24C, and the cylinder lens for cyan image 25C in order and is reflected by the light-source-side reflection mirror for cyan image 27C, combined with the light for black image by the half-mirror for black image 26K, and then deflected by the polygon mirror 28. The light for black image and the light for cyan image are deflected to one side of the housing 31 by the polygon mirror 28.

Light emitted from the laser diode for yellow image 21Y passes through the collimate lens for yellow image 23Y, the aperture for yellow image 24Y, the cylinder lens for yellow image 25Y, and the half-mirror for yellow image 26Y in order and is deflected by the polygon mirror 28. Light emitted from the laser diode for magenta image 21M passes through the collimate lens for magenta image 23M, the aperture for magenta image 24M, and the cylinder lens for magenta image 25M in order and is reflected by the light-source-side reflection mirror for magenta image 27M, combined with light for yellow image by the half-mirror for yellow image 26Y, and then deflected by the polygon mirror 28. The light for yellow image and the light for magenta image are deflected to the other side of the housing 31 by the polygon mirror 28.

The light for black image and the light for cyan image deflected by the polygon mirror 28 travel in the horizontal direction, pass through the first fθ lens 29a, and are deflected by the first reflection mirror 30a at a right angle. The light for black image and the light for cyan image reflected by the first reflection mirror 30a travel in the vertical direction, pass through the second fθ lens 32a, are reflected by the second reflection mirror 33a at a right angle, and travel in the horizontal direction toward the polygon mirror 28. The light for black image reflected by the second reflection mirror 33a at a right angle is reflected by the third reflection mirror 34K and the fourth reflection mirror 35K, exits to the outside of the housing 31 (the laser optical unit 20) through the hole 31K, and is irradiated on a photoconductive member 61K. The light for cyan image reflected by the second reflection mirror 33a at a right angle is reflected by the third reflection mirror 34C and the fourth reflection mirror 35C, exits to the outside of the housing 31 through the hole 31C, and is irradiated on a photoconductive member 61C.

The same applies to the light for yellow image and the light for magenta image deflected by the polygon mirror 28. Therefore, explanation concerning the light for yellow image and the light for magenta image is omitted.

As explained above, in the laser optical unit 20, the polygon mirror 28 is provided in the center in a first direction, which is the horizontal direction, of the laser optical unit 20. The first fθ lenses 29a and 29b that allow the lights for plural color images deflected by the polygon mirror 28 to pass in the horizontal direction are provided on both sides of the polygon mirror 28. Further, in the laser optical unit 20, the common second fθ lenses 32a and 32b that allow the lights for plural color images passed through the first fθ lenses 29a and 29b to pass in the vertical direction are provided near the sidewalls in the horizontal direction of the laser optical unit 20. Therefore, the laser optical unit 20 does not have areas divided in the horizontal direction: an area for one polygon mirror that deflects the all lights for images and an area for reflection mirrors that distribute colors. Therefore, a housing short in the horizontal direction can be provided. As the image forming apparatus including the laser optical unit 20, an apparatus short in the horizontal direction can be provided. As the second fθ lenses, the lenses longer in the horizontal direction than in the direction in which light passes, i.e., the vertical direction are used. Therefore, the laser optical unit 20 can be provided without substantially increasing the length in the vertical direction thereof as well. Further, in the laser optical unit 20, the second fθ lens allows, with one lens, light for plural color images to pass. Therefore, the laser optical unit 20 is reduced in size through a decrease in the number of fθ lenses.

In this embodiment, the color multi function peripheral is explained as an example of the image forming apparatus. However, the image forming apparatus is not limited to this and may be a multi function peripheral including four laser diodes for black image or may be a printer not including the scanner section 3.

While certain embodiments have been described these embodiments have been presented by way of example only, and are not intended to limit the scope of the inventions. Indeed, the novel apparatus and methods described herein may be embodied in a variety of other forms: furthermore various omissions, substitutions and changes in the form of the apparatus and methods described herein may be made without departing from the spirit of the inventions. The accompanying claims and their equivalents are intended to cover such forms of modifications as would fall within the scope and spirit of the invention.

What is claimed is:

1. An optical scanning device comprising:
plural light sources;
a polygon mirror that reflects light emitted from two of the plural light sources in a predetermined direction;
a first fθ lens through which light emitted from the two of the plural light sources and reflected by the polygon mirror passes;
a first reflection mirror that reflects light from the two of the plural light sources that has passed through the first fθ lens, in a direction different from the predetermined direction;
a second fθ lens through which light from the two of the plural light sources that has been reflected by the first reflection mirror passes, an incident direction of the light on the second fθ lens being orthogonal to an incident direction of the light on the first fθ lens:
a third fθ lens;
a fourth fθ lens; and
a second reflection mirror, wherein:
the first and third fθ lenses, the second and fourth fθ lenses, and the first and second reflection mirrors are arranged as respective pairs having symmetry with respect to a plane orthogonal to the predetermined direction and including the axis of rotation of the polygon mirror.

2. The device according to claim 1, wherein:
the plural light sources comprise four light sources,
light emitted from two of the four light sources passes through the first and second fθ lenses, and
light emitted from the other two of the four light sources passes through the third and fourth fθ lenses.

3. The device according to claim 1, further comprising a housing that houses the plural light sources, the polygon mirror, the first fθ lens, the second fθ lens, the third fθ lens, the fourth fθ lens, the first reflection mirror, and the second reflection mirror.

4. The device according to claim 3, wherein the second fθ lens and the fourth fθ lens are each supported by supporting sections extending from sidewalls of the housing.

5. The device according to claim 4, wherein a length of the supporting sections is smaller than a length of the respectively supported second fθ lens and the fourth fθ lens.

6. The device according to claim 1, wherein a length of the first fθ lens in an optical axis direction is smaller than a length of the first fθ lens in a direction orthogonal to the optical axis.

7. The device according to claim 1, wherein a length of the second fθ lens in an optical axis direction is smaller than a length of the second fθ lens in a direction orthogonal to the optical axis.

8. An image forming apparatus comprising:
plural light sources;
a polygon mirror that reflects light emitted from two of the plural light sources in a predetermined direction;
a first fθ lens through which light emitted from the two of the plural light sources and reflected by the polygon mirror passes;
a first reflection mirror that reflects light from the two of the plural light sources that has passed through the first fθ lens, in a direction different from the predetermined direction;
a second fθ lens through which light from the two of the plural light sources that has been reflected by the first reflection mirror passes, an incident direction of the light on the second fθ lens being orthogonal from an incident direction of the light on the first fθ lens;
plural photoconductive members on which light passed through the second fθ lens is irradiated and a latent image is formed;
a developing device that supplies developers to the photoconductive members and forms toner images on the photoconductive members; and
a transfer device that transfers the toner images formed on the photoconductive members by the developing device onto a recording medium
a third fθ lens;
a fourth fθ lens; and
a second reflection mirror, wherein:
the first and third fθ lenses, the second and fourth fθ lenses, and the first and second reflection mirrors are arranged as respective pairs having symmetry with respect to a plane orthogonal to the predetermined direction and including the axis of rotation of the polygon mirror.

9. The apparatus according to claim 8, further comprising a housing that houses the plural light sources, the polygon mirror, the first fθ lens, the second fθ lens, the third fθ lens, the fourth fθ lens, the first reflection mirror, and the second reflection mirror, wherein
the second fθ lens and the fourth fθ lens are each supported by supporting sections extending from sidewalls of the housing, and
a length of the supporting sections is smaller than a length of the respectively supported second fθ lens and the fourth fθ lens.

10. The apparatus according to claim 8, wherein a length of the second fθ lens in an optical axis direction is smaller than a length of the second fθ lens in a direction orthogonal to the optical axis.

* * * * *